US006831933B2

(12) United States Patent
Biedron et al.

(10) Patent No.: US 6,831,933 B2
(45) Date of Patent: Dec. 14, 2004

(54) MODULAR APPROACH TO THE NEXT GENERATION, SHORT WAVELENGTH, LASER-LIKE LIGHT SOURCES

(75) Inventors: Sandra Gail Biedron, Palos Park, IL (US); Henry Philip Freund, Vienna, VA (US); Stephen Val Milton, Naperville, IL (US)

(73) Assignee: The University of Chicago, Chicago, IL (US)

( * ) Notice: Subject to any disclaimer, the term of this patent is extended or adjusted under 35 U.S.C. 154(b) by 515 days.

(21) Appl. No.: 09/916,458

(22) Filed: Jul. 27, 2001

(65) Prior Publication Data

US 2003/0026300 A1 Feb. 6, 2003

(51) Int. Cl.[7] .................................................. H01S 3/00
(52) U.S. Cl. ............................ 372/2; 372/22; 372/23; 372/74; 372/109
(58) Field of Search .............................. 372/2, 22, 23, 372/74, 109

(56) References Cited

U.S. PATENT DOCUMENTS

| | | | | |
|---|---|---|---|---|
| 4,466,101 A | * | 8/1984 | Schoen ........................... | 372/2 |
| 4,835,446 A | * | 5/1989 | Nation et al. .................. | 315/5.13 |
| 5,117,431 A | * | 5/1992 | Yamada ......................... | 372/2 |
| 6,636,534 B2 | * | 10/2003 | Madey et al. ................. | 372/2 |
| 2002/0044573 A1 | * | 4/2002 | Bennett .......................... | 372/2 |

* cited by examiner

*Primary Examiner*—Tom Thomas
*Assistant Examiner*—Matthew E. Warren
(74) *Attorney, Agent, or Firm*—Joan Pennington (57) ABSTRACT

A system and method for implementing a next generation laser-like light source with Free Electron Lasers (FELs) are provided whereby the construction of a Free Electron Laser (FEL) is customized through the use of individual modules having specified characteristics. Such individual modules include conventional lasers, electron guns, linear accelerators, magnetic bunch compressors and permanent magnet, hybrid, and electromagnetic, undulators or a combination of these undulators. These individual modules are arranged to exploit the occurring fundamental and nonlinear harmonics generated in each SP HG FEL to be used themselves as a light source, or alternatively to be a coherent seed for another module, such as, in high-gain harmonic generation (HGHG). An efficient method for producing shorter wavelengths of a synchrotron light source is provided. A three step process including imprinting, upconverting or wavelength shifting and reinforcing or strengthening of the electron beam microbunching is provided. The modular FEL is designed and constructed to meet specific user requirements in the most cost-effective manner. The modular single-pass, high-gain Free Electron Laser (SP HG FEL) significantly reduces the size and cost of FEL machines, obtains the shortest wavelength, has the ability to tune the output wavelength, and retains the coherence quality of the seed laser.

20 Claims, 6 Drawing Sheets

MODULAR APPROACH TO THE NEXT GENERATION, SHORT WAVELENGTH, LASER-LIKE LIGHT SOURCES

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to a modular system and method for implementing next generation light sources with Free Electron Lasers (FELs).

DESCRIPTION OF THE RELATED ART

The Advanced Photon Source (APS) at Argonne National Laboratory is a national synchrotron-radiation light source research facility. Utilizing high-brilliance x-ray beams from the APS, members of the international synchrotron-radiation research community carry out forefront basic and applied research in the fields of materials science; biological science; physics; chemistry; environmental, geophysical, and planetary science; and innovative x-ray instrumentation.

The Advanced Photon Source (APS) is a third-generation synchrotron radiation source that stores electrons in a storage ring. The third-generation synchrotron radiation sources are designed to have low beam emittance and many straight sections for insertion devices, undulator magnets. This makes for a bright beam of x-rays; however the x-ray pulses are long (10–100 picoseconds) and incoherent longitudinally and only partially coherent in the transverse dimension. This incoherence arises from the fact that this radiation is spontaneously, or randomly, emitted from the electrons.

The APS facility is comprised of three basic systems: the injection system, the storage ring system, and the experimental beamlines. The components of the injection system are listed according to the causal flow of electrons. The individual components of the injection system include the electron source, the linear accelerator (linac) system, low energy transport line from linac to the PAR, particle accumulator ring or PAR, low energy transport line from PAR to booster synchrotron, and the high energy transport line from booster synchrotron to storage ring. This system is similar to other synchrotron light source centers around the globe.

The beam acceleration and storage process begins at the electron gun (source). An electron bunch train ten (10) nanoseconds long are raised to an energy of 450 million electron volts (MeV) at up to thirty (30) pulses per second by a series of radio frequency (2856 MHz) accelerating structures in the linac. The PAR is used to accumulate and damp the pulse train into a single bunch suitable for injection into the booster synchrotron. The 368-m long, racetrack-shaped booster synchrotron raises electron energies at a rate of 32 keV per turn. The accelerating force is supplied by electrical fields within four 5-cell radio frequency (RF) cavities operating at 352 MHz, the same frequency used by the storage ring RF cavities. In 0.25 sec, electrons orbit the booster 200,000 times as their energy climbs to 7 billion electron volts (GeV). The electrons are then injected into the storage ring.

Electrons injected into the 1104-m circumference storage ring orbit the ring more than 271,000 times per second. The beam of electrons is steered and focused by 1097 powerful electromagnets as it travels within a closed system of 240 aluminum alloy vacuum chambers running through the magnet centers. The beam loses energy at a rate of about 6 MeV per turn as it emits synchrotron radiation. This energy loss is replaced by the storage ring 352-MHz RF systems.

The APS storage ring magnetic system is based upon the Chasman-Green lattice, a specialized magnetic lattice developed for synchrotron light sources. There are forty Chasman-Green sectors in all for a total length of 1104 m. Five sectors are used for either the RF systems or the beam injection system. The remaining 35 have two beamlines for extracting the x-rays to the experimental end stations. One beamline in each sector is used to extract the x-rays from bending magnets while the other is aligned with a straight section that houses a specialized magnet, either an undulator and a wiggler.

Although the Advanced Photon Source's x-rays are very useful to the user community with its long pulses and incoherent properties, there is a desire to produce and use significantly shorter, coherent, and, thus, laser-like pulses. Unfortunately, traditional lasers based upon atomic transitions do not permit us to produce such laser-like photons or radiation at the hard x-ray wavelengths. A need exists for a next generation synchrotron radiation (light) source that would provide better properties, more flexibility and more laser-like pulses than the Advanced Photon Source (APS) at Argonne National Laboratory.

A principal object of the present invention is to provide an improved, next-generation light source.

Another object of the present invention is to provide an improved method for implementing a next generation light source.

Another object of the present invention is to provide a modular next-generation light source that provides a coherent, laser-like, ultra-short wavelength radiation source.

Another object of the present invention is to provide a modular next-generation light source for use by a large user community of synchrotron radiation and laser sources with wavelength ranges extending from the vacuum ultraviolet (VUV) to the hard x-ray regime.

Another object of the present invention is to provide a harmonic-based, short-wavelength source that can provide a higher brightness and is more laser-like than existing sources.

Another object of the present invention is to provide a harmonic-based, short-wavelength source that can be achieved with a much lower electron beam energy than a FEL-based source using the fundamental radiation only.

Another object of the present invention is to provide a next-generation light source capable of producing pulses that have ultra-short pulse lengths exhibiting temporal coherence and transform-limited bandwidths unachievable by the existing third-generation sources.

Another object of the present invention is to provide a way to shift output pulse wavelengths originally derived from an input seed laser.

Another object of the present invention is to provide a next-generation light source and method for implementing a next generation synchrotron light source substantially without negative effect and that overcome some disadvantages of prior art arrangements.

SUMMARY OF THE INVENTION

In brief, a system and method for implementing a next generation synchrotron light source with Free Electron Lasers (FELs) are provided whereby the construction of a Free Electron Laser (FEL) is customized through the use of individual modules having specified characteristics. Such individual modules include lasers, electron guns, linear accelerators, magnetic bunch compressors, permanent magnet undulators and specialized optical arrangements. These individual modules are arranged to exploit the occurring fundamental and nonlinear harmonics generated in single-pass, high-gain Free Electron Laser (SP HG FEL) both of which can be used as the final product, or alternatively to be a coherent seed for another module.

In accordance with features of the invention, an improved method is provided for producing arbitrary wavelengths with a next generation synchrotron light source independent of a seed pulse wavelength. Ultra-short pulse lengths exhibiting full temporal coherence are produced through a three step process. The electron beam processing includes imprinting; upconverting or wavelength shifting; and reinforcing or strengthening.

In accordance with features of the invention, the modular FEL is designed and constructed to meet specific user requirements in the most cost-effective manner. The modular single-pass, high-gain Free Electron Laser (SP HG FEL) significantly reduces the size and cost of FEL machines, obtains the shortest wavelength, has the ability to tune the output wavelength, and retains the coherence quality of the seed laser.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, multiple combinations of modules are utilized to produce next-generation x-ray light sources that are more flexible and have better properties, such as flux and brilliance, than current third-generation synchrotron radiation sources. Also these modular arrangements constitute an enhancement, both in source properties and reduction of cost, over the currently proposed single-pass, high-gain free electron lasers based upon simple self amplified spontaneous emission.

Flux, brilliance, and coherence are quantitative measures of third and next-generation synchrotron light sources. Various modular arrangements described below are used to enhance the flux, brilliance, and coherence beyond that of present or simple single-pass, high-gain, self-amplified spontaneous emission systems.

In accordance with features of the invention, a process is provided using various modules to generate short wavelength coherent light. The atomic modules used to achieve FEL action of the invention include thermonic and photocathode, radio-frequency (RF) guns and associated drive lasers; linear accelerators; bunch compressor systems; lasers; and planar and helical undulator systems. These are combined to exploit the naturally occurring nonlinear harmonics of SP HG FELs, seeded amplifier arrangements, two or multiple undulators, harmonic generation schemes, and a wavelength shifting scheme. The net effect is to enhance the source properties at a given wavelength while at the same time reducing the overall system cost.

Enhancement of the source properties is the result of providing a seed signal by which the SP HG FEL can amplify. This is opposed to the start up from spontaneous noise as presently used in self amplified spontaneous emission systems.

Nonlinear harmonics, two or multiple undulators, harmonic generation, and high-gain harmonic generation are used to convert the seed wavelength to shorter wavelengths where the final wavelength is an exact integer multiple of the original wavelength.

Wavelength shifting is used to break the integer wavelength relationship with the seed and allow full wavelength tuning of the output.

As an example, one combination of modules can produce coherent light radiation up to the thirty-fifth harmonic (7.6 nm) of a coherent seed laser of 266 nm. Although there will be a reduction of the final peak power if the nonlinear harmonics are used another module may be used to further amplify the nonlinear harmonic radiation power, if needed. In addition, wavelength shifting can be used to tune away from the 7.6 nm thirty-fifth harmonic, if desired.

In accordance with features of the invention, the arrangements of multiple combinations of modules for achieving the next-generation x-ray light source or any light source allows: 1) imparting full longitudinal coherence on the output radiation by seeding with a coherent source at a much lower wavelength than that of the desired output wavelength, 2) the use of multiple seeding configurations to achieve an ultrashort wavelength based upon substantial frequency up-conversion (wavelength shifting), 3) utilizing a much lower electron beam energy to produce the desired wavelengths, and 4) the option of implementing shorter radiation wavelengths by first starting with a modest system and then adding additional modules, as time, money, and space permit.

The multiple modular combinations alone, less the higher nonlinear harmonics, represents a powerful tool; but with higher nonlinear harmonics, shorter wavelengths can be reached beyond those available from the fundamental in single-pass, high-gain FELs. In a self-amplified spontaneous emission (SASE) or amplifier system, the nonlinear harmonics appear to be substantial and quite useful. In Two-Undulator Harmonic Generation Systems (TUHGS) and High-Gain Harmonic Generation (HGHG) schemes, however, the downstream undulator is tuned to a higher harmonic than the input seed laser, generating coherent output at the fundamental and at the higher nonlinear harmonics of this second undulator. In other words, in TUHGS and HGHG schemes, the shorter wavelengths are attainable more readily than in the SASE and amplifier schemes. The nonlinear harmonics arise in all single-pass FELs based on the planar undulator designs.

Figure 1:
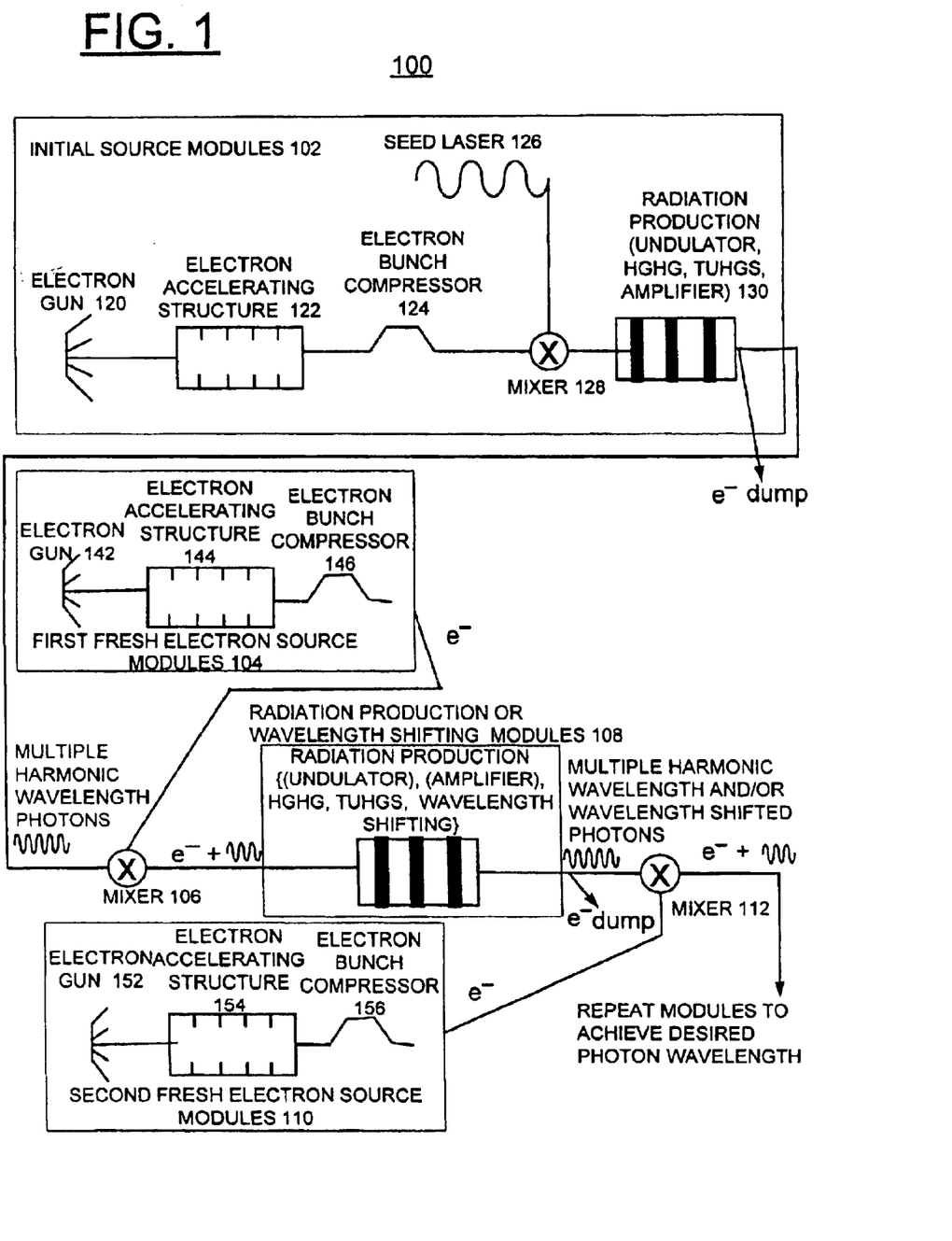
FIG. 1 is a block diagram illustrating an exemplary system for implementing a next-generation light source in accordance with the preferred embodiment.

Having reference now to the drawings, FIG. 1 illustrates an exemplary single-pass, high-gain free-electron laser (SP HG FEL) system for implementing a next-generation light source based upon a modular arrangement in accordance with the preferred embodiment generally designated by the reference character 100. Next-generation light source system 100 includes initial source modules 102, first fresh electron source modules 104, and a mixer 106 for combining the output of the initial source modules 102 and the output of the first fresh electron source modules 104. Next-generation light source system 100 includes radiation production or wavelength shifting modules 108, second fresh electron source modules 110, and a mixer 112 for combining the respective output of the radiation production or wavelength shifting modules 108 and the second fresh electron source modules 110. Additional modules (not shown) can be coupled to the mixer 112 to achieve a desired or additional photon wavelengths, if needed.

Initial source modules 102 include an electron gun 120, an electron accelerating structure 122 receives emitted electrons from the electron gun and raises the electron energy of the electron beam, an electron bunch compressor 124 where the electron beam is compressed to produce a high peak current, a seed laser 126 produces a seed laser beam that is coupled with the electron beam in a mixer 128, and a radiation production section 130 that is tuned to the desired wavelength. Radiation production section 130 includes, for example, an undulator (amplifier), high-gain harmonic generation (HGHG), and two-undulator harmonic generation systems (TUHGS). A wavelength shifter may also be included. Initial source modules 102 produce multiple harmonic wavelength photons, the desired of which can be applied to mixer 106. As shown, the electron beam output of the initial source modules 102 is applied to an electron beam dump indicated at line labeled e⁻ dump. It should be understood that there is no need to throw away the electron beam, the electron beam dump is provided for ease of understanding or conceptualization only.

Figure 6:
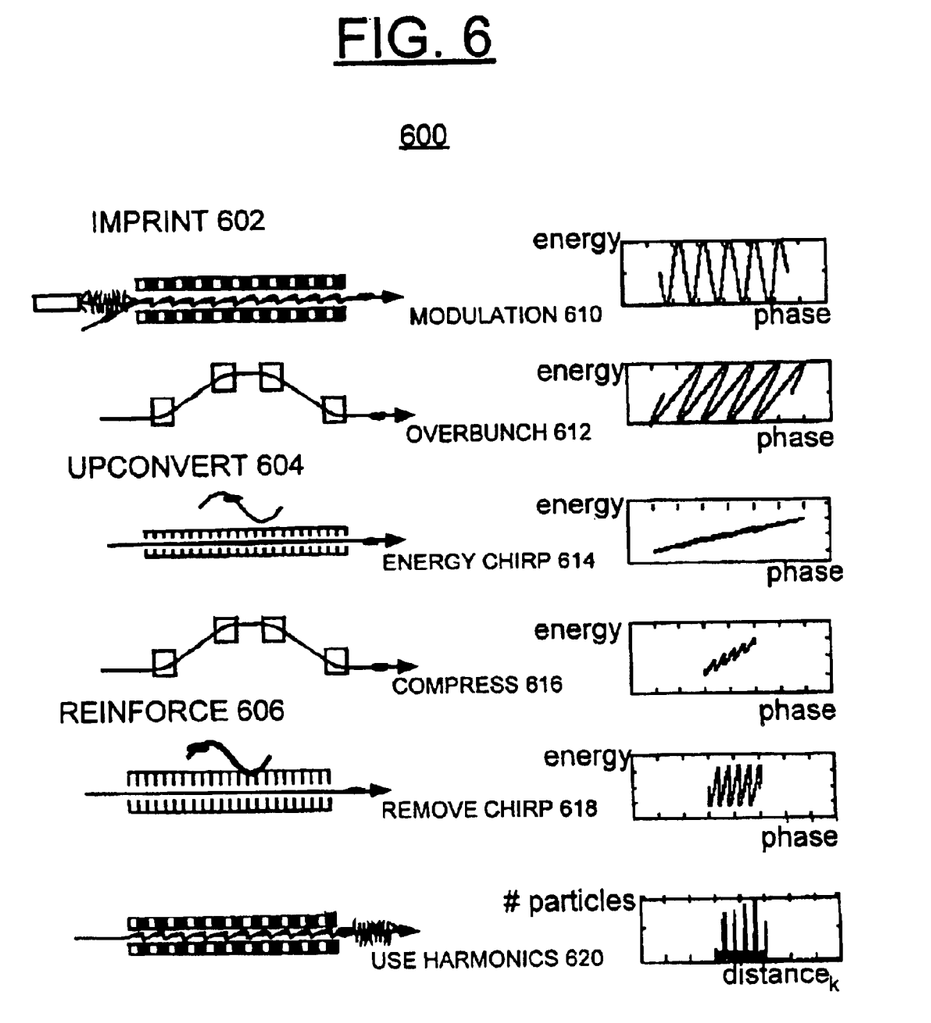
FIG. 6 is a diagram illustrating an exemplary fifth example of a modular arrangement for implementing a next-generation light source in accordance with the preferred embodiment.

First fresh electron source modules 104 include an electron gun 142, an electron accelerating structure 144 and an electron bunch compressor 146. First fresh electron source modules 104 produces an electron beam indicated at line labeled e⁻ that is applied to mixer 106. The combined output of mixer 106 is applied to the radiation production or wavelength shifting modules 108. Radiation production or wavelength shifting modules 108 include one or more selected modules such as, an undulator (amplifier), high-gain harmonic generation (HGHG), two-undulator harmonic generation systems (TUHGS), whereas wavelength shifting employs a combination of accelerators, bunch compressors, and undulators (amplifiers), as illustrated in FIG. 6. Radiation production or wavelength shifting modules 108 produce multiple harmonic wavelength and/or wavelength shifted photons that could be applied to second fresh electron source module 110. The electron beam output of the radiation production or wavelength shifting modules 108 is applied to an electron beam dump indicated at line labeled e⁻ dump. The combined output of mixer 112 could be applied to additional modules, such as radiation production or wavelength shifting modules 108, until a desired photon wavelength is achieved or used as a light source. Unused harmonics or fundamental are themselves light sources. One could pick-off partially the harmonic to seed the next section of a light source.

Many combinations of the modular path toward the next-generation light source are provided by the present invention, five major representative examples are described. In these examples, the electron beams never exceed 6 GeV, attempts are made to use the lowest number of new electron beams and the shortest possible radiation production lines, such as undulators, and the like, while applying the methods of single-pass, high-gain free-electron lasers (SP HG FELs). Along with the most necessary modules of linear accelerators, seed lasers, bunch compressors, and nonlinear harmonic generation, the following best exemplify the general techniques employed using module combinations. Multiple amplifier modules are illustrated and described with respect to FIG. 2. Multiple HGHG modules are illustrated and described with respect to FIG. 3. Multiple amplifier and HGHG modules are illustrated and described with respect to FIG. 4. A soft x-ray seed laser amplifier and one HGHG Module is illustrated and described with respect to FIG. 5. A wavelength shifting arrangement of the preferred embodiment is illustrated and described with respect to FIG. 6.

Figure 2:
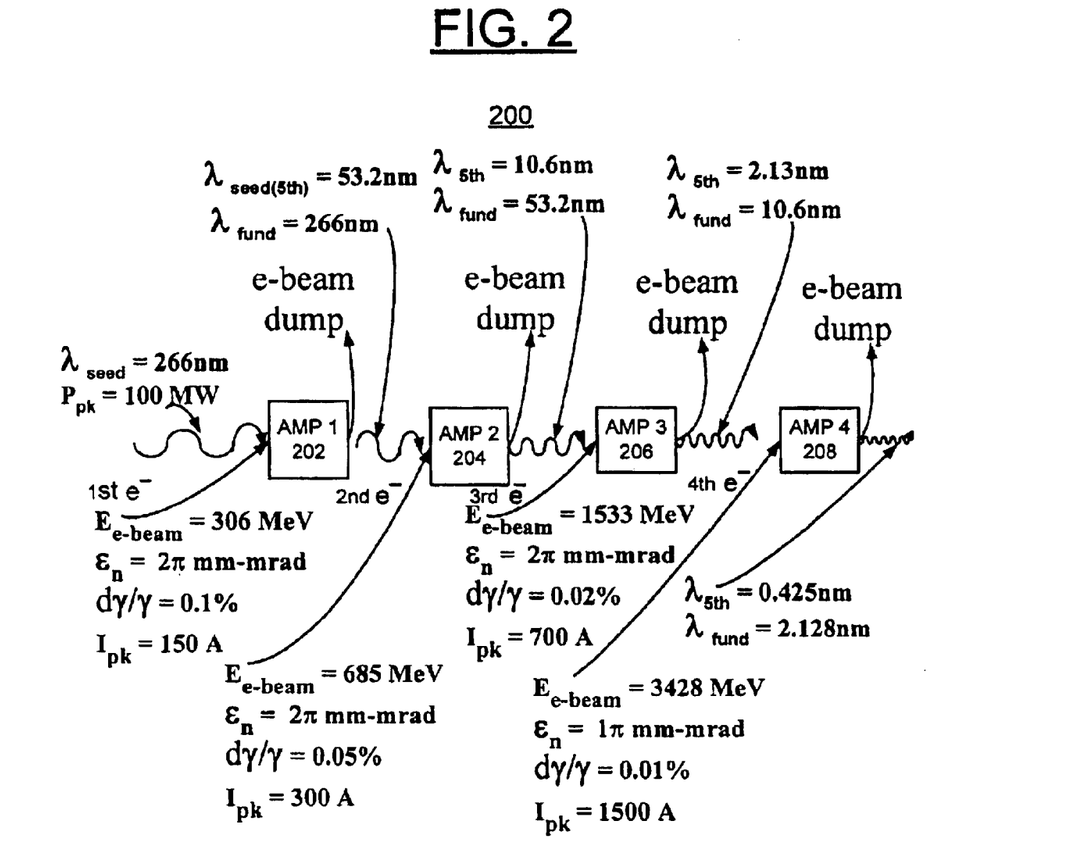
FIG. 2 is a diagram illustrating an exemplary first example of a modular arrangement for implementing a next-generation light source in accordance with the preferred embodiment.

Referring to FIG. 2, there is shown a first example or first arrangement generally designated by the reference character 200. The first arrangement 200 is composed of four amplifier modules AMP 1–4 202, 204, 206 and 208 connected in series tuned to the desired fundamental resonance with four fresh electron bunches. Fresh electron bunches are shown for the sake of easier conceptualization; one linac and electron beam cleaning could be performed. The fifth nonlinear harmonic of the respective output radiation from AMP 1–3, 202, 204, 206 each seed the next respective module 2–4, 204, 206 and 208. In the amplifier system of first generation arrangement 200, a seed laser $\lambda_{seed}$=266 nm, $P_{pk}$=100 MW serves to seed the system and imparts full longitudinal coherence on the output. The seed laser parameters $\lambda_{seed}$=266 nm, $P_{pk}$=100 MW are taken from commercially available or traditional laser systems.

As shown in FIG. 2, the $\lambda_{seed}$=266 nm, $P_{pk}$=100 MW seed laser together with a first electron beam 1st e⁻ is applied to the first AMP 1, 202. Properties of the first electron beam 1st e⁻ include, for example, electron beam energy $E_{e\text{-}beam}$=306 MeV, normalized natural emittance $\epsilon_n$=2π mm-mrad, energy spread dγ/γ=0.1%, and peak current $I_{pk}$=150 A. In the first AMP 1, 202, the incoming electron beam is tuned to the desired output wavelength via a conventional resonance condition and the traditional laser, that is also at this resonant wavelength; serves to seed the system and imparts full longitudinal coherence on the output. The electron beam output of first AMP 1, 202 is bent into an electron beam dump indicated at line labeled e⁻ dump. The fifth nonlinear harmonic $\lambda_{seed(fifth)}$=53.2 nm generated in first AMP 1, 202 and applied to second AMP 2, 204 is used as a coherent seed for second AMP 2, 204. A second electron beam 2nd e⁻ is applied to the second AMP 2, 204 having electron beam properties, for example, electron beam energy $E_{e\text{-}beam}$=685 MeV, normalized natural emittance $\epsilon_n$=2π mm-mrad, energy spread dγ/γ=0.05%, and peak current $I_{pk}$=300A. The electron beam output of AMP 2, 204 is bent into an electron beam dump indicated at line labeled e⁻ dump. The fifth nonlinear harmonic $\lambda_{fifth}$=10.6 nm generated in second AMP 2, 204 and applied to third AMP 3, 206 is used as a coherent seed for third AMP 3, 206. A third fresh electron beam 3rd e⁻ is applied to the third AMP 3, 206 having electron beam properties, for example, electron beam energy $E_{e-beam}$=1533 MeV, normalized natural emittance $\epsilon_n$=2π mm-mrad, energy spread dγ/γ=0.02%, and peak current $I_{pk}$=700A. The electron beam output of AMP 3, 206 is bent into an electron beam dump indicated at line labeled e⁻ dump. The third nonlinear harmonic $\lambda_{fifth}$=2.13 nm generated in second AMP 3, 206 and applied to fourth AMP 4, 208 is used as a coherent seed for fourth AMP 4, 208. A fourth electron beam 4th e⁻ is applied to the fourth AMP 4, 208 having electron beam properties, for example, electron beam energy $E_{e-beam}$=3428 MeV, normalized natural emittance $\epsilon_n$=1π mm-mrad, energy spread dγ/γ=0.01%, and peak current $I_{pk}$=1500A. The final wavelength, the fifth nonlinear harmonic of AMP 4, 208, is $\lambda_{fifth}$=0.425 nm or 4.256 Å with an electron beam energy of ~3.4 GeV.

Figure 3:
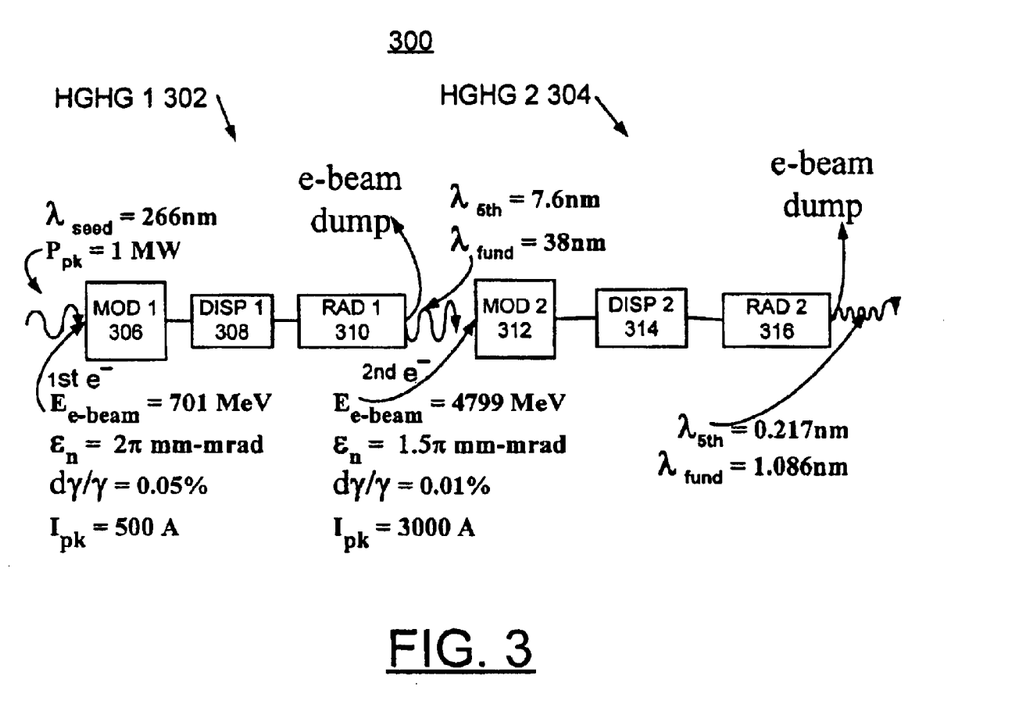
FIG. 3 is a diagram illustrating an exemplary second example of a modular arrangement for implementing a next-generation light source in accordance with the preferred embodiment.

Referring to FIG. 3, there is shown a second example or second arrangement generally designated by the reference character 300. The second arrangement 300 is composed of two HGHG modules. It should be understood that either the TUHGS or the HGHG modules can represent this type of combination, while the case of multiple HGHG modules is shown in FIG. 3. The second arrangement 300 includes cascading stages of first and second HGHG modules HGHG 1, 302 and HGHG 2, 304 utilizing the higher nonlinear harmonics in the system. Of the five examples, the second arrangement 300 provides the shortest wavelength at a relatively low electron beam energy with the least number of new electron bunches.

As shown in FIG. 3, a laser of $\lambda_{seed}$=266 nm with $P_{pk}$=1 MW is used as the seed for the first HGHG module, HGHG 1, 302. This seed is the original fundamental wavelength that drives the entire resultant system. The seed laser of $\lambda_{seed}$= 266 nm is introduced to place full longitudinal coherence on the output radiation. Each HGHG module 302, 304 respectively includes a modulative section, MOD 1, MOD 2, 306, 312, a dispersive section DISP 1, DISP 2, 308, 314 and a radiative section RAD 1, RAD 2, 310, 316. A first undulator or modulative section MOD 1, 306 is tuned in resonance to the input seed wavelength and serves to impart an energy modulation on the electron beam. The input seed wavelength is referred to as the original fundamental. The energy modulation is converted into spatial bunching while traversing the dispersive section DISP 1, 308. The electron beam enters a second undulator or the radiative section RAD 1, 310 which is tuned to the desired output harmonic. The fundamental of the radiative section RAD 1, 310 is the new fundamental.

Along with the seed laser, a first electron beam labeled 1st e⁻ enters HGHG 1, 302. First electron beam 1st e⁻ has electron beam properties, for example, electron beam energy $E_{e-beam}$=701 MeV, normalized natural emittance $\epsilon_n$=2π mm-mrad, energy spread dγ/γ=0.05%, and peak current $I_{pk}$=500 A. Seed laser $\lambda_{seed}$=266 nm and electron beam 1st e⁻ enters HGHG 1, 302 where the energy modulation and spatial bunching are induced in the modulative and dispersive sections, 306 and 308, respectively. Radiative section RAD I, 310 is tuned to $\lambda_{fund}$=38 nm that is the seventh harmonic of the original fundamental $\lambda_{seed}$=266 nm. As shown in FIG. 3, the fifth nonlinear harmonic, $\lambda_{5th}$=7.6 nm of the output from RAD 1, 310, which is the $35^{th}$ harmonic to the original fundamental, is applied to modulative section MOD 2, 312 and used to seed the second HGHG module HGHG 2, 304. The first electron beam is bent into a dump indicated as e-beam dump. A second electron beam labeled 2nd e⁻ enters HGHG 2, 304. The second electron beam 2nd e⁻ has electron beam properties, for example, electron beam energy $E_{e-beam}$=4799 MeV, normalized natural emittance $\epsilon_n$=1.5π mm-mrad, energy spread dγ/γ=0.01%, and peak current $I_{pk}$=3000 A. The second ~4.8-GeV electron beam enters HGHG 2, 304 along with the fifth nonlinear harmonic, $\lambda_{5th}$=7.6 nm seed. The seeding in the second modulative section MOD 2, 312 grows until the desired energy modulation is imparted on the electron beam. The beam then passes through the dispersive section DISP 2, 314 and through radiative section RAD 2, 316. Radiative section RAD 2, 316 is tuned to the seventh harmonic of the 7.6 nm seed, which is 1.086 nm. Here, the longitudinally coherent output radiation in the fifth nonlinear harmonic $\lambda_{5th}$ has a wavelength of 2.1 Å.

Figure 4:
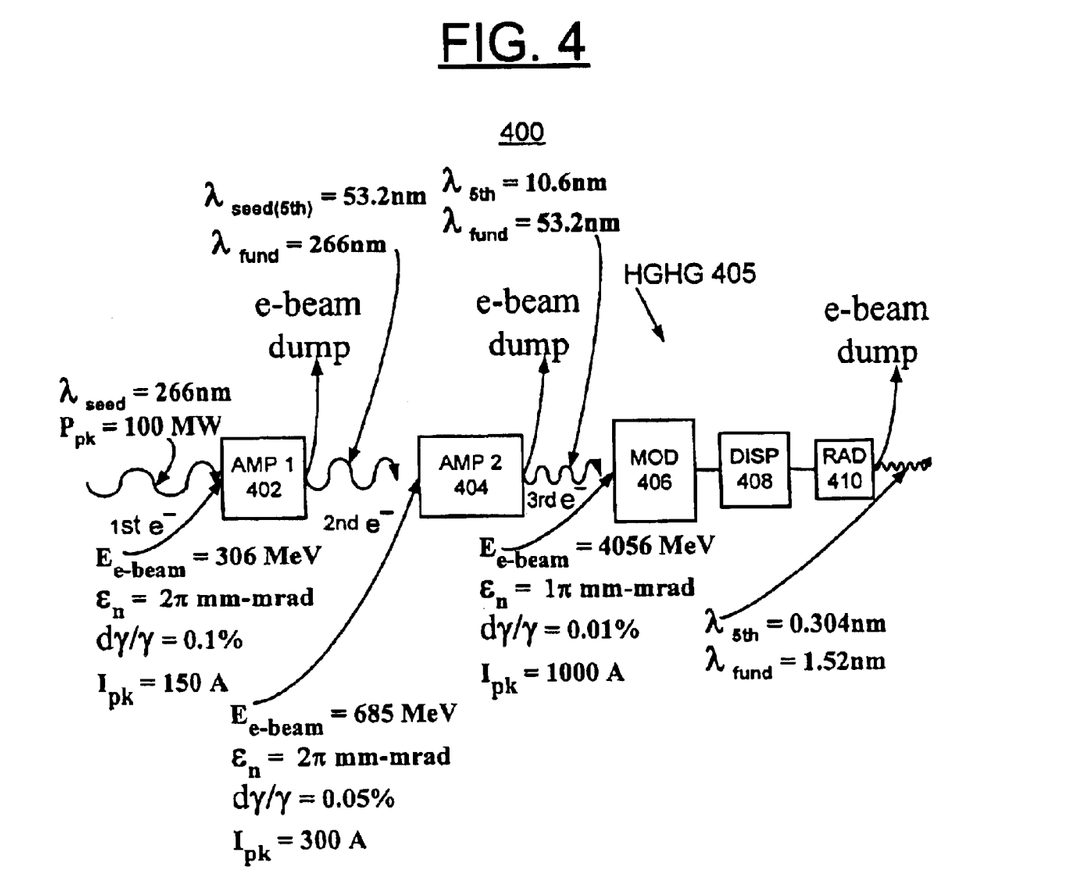
FIG. 4 is a diagram illustrating an exemplary third example of a modular arrangement for implementing a next-generation light source in accordance with the preferred embodiment.

Referring to FIG. 4, there is shown a third example or third arrangement generally designated by the reference character 400. Third arrangement 400 employs the same $\lambda_{seed}$=266 nm, $P_{pk}$=100 MW seed laser as described with respect to the first arrangement 200 of FIG. 2 and uses three fresh electron bunches, 1st e⁻, 2nd e_, and 3rd e⁻ in a pair of amplifier modules AMP 1, AMP 2, 402, 404 and one HGHG module HGHG 405, respectively. First electron beam 1st e⁻ applied to AMP 1, 402 has electron beam properties, for example, electron beam energy $E_{e-beam}$=306 MeV, normalized natural emittance $\epsilon_n$=2π mm-mrad, energy spread dγ/γ=0.1%, and peak current $I_{pk}$=150 A. The electron beam output of first AMP 1, 402 is bent into an electron beam dump indicated at line labeled e-beam dump. Second electron beam 2nd e⁻ applied to AMP 2, 404 has electron beam properties, for example, electron beam energy $E_{e-beam}$=685 MeV, normalized natural emittance $\epsilon_n$=2π mm-mrad, energy spread dγ/γ=0.05%, and peak current $I_{pk}$=300 Å. The electron beam output of first AMP 2, 404 is bent into an electron beam dump indicated at line labeled e-beam dump. It should be understood that an alternative to the HGHG module 405 is to use a TUHGS module (not shown). As similarly seen in the first arrangement 200, the fifth nonlinear harmonic output from AMP 2 and AMP 2 serve as seeds for the amplifier modules AMP 2, 404 and HGHG module 405 in the third arrangement 400 of FIG. 4. Third electron beam 3rd e⁻ applied to HGHG module 405 has electron beam properties, for example, electron beam energy $E_{e-beam}$=4056 MeV, normalized natural emittance $\epsilon_n$=1π mm-mrad, energy spread dγ/γ=0.01%, and peak current $I_{pk}$=1000 A. HGHG module 405 includes a modulative section MOD 406, a dispersive section DISP 408 and a radiative section RAD 410. The modulative section MOD 406 in the HGHG module 405 is long enough to induce the desired energy modulation on the electron beam. The radiative section RAD 410 in HGHG 405 is tuned to the seventh harmonic of the input seed from AMP 2, 404. The electron beam output of HGHG module 405 is bent into an electron beam dump indicated at line labeled e-beam dump. The final wavelength in the fifth nonlinear harmonic emitted $\lambda_{5th}$ is 3.04 Å with an electron beam energy of ~4 GeV.

Figure 5:
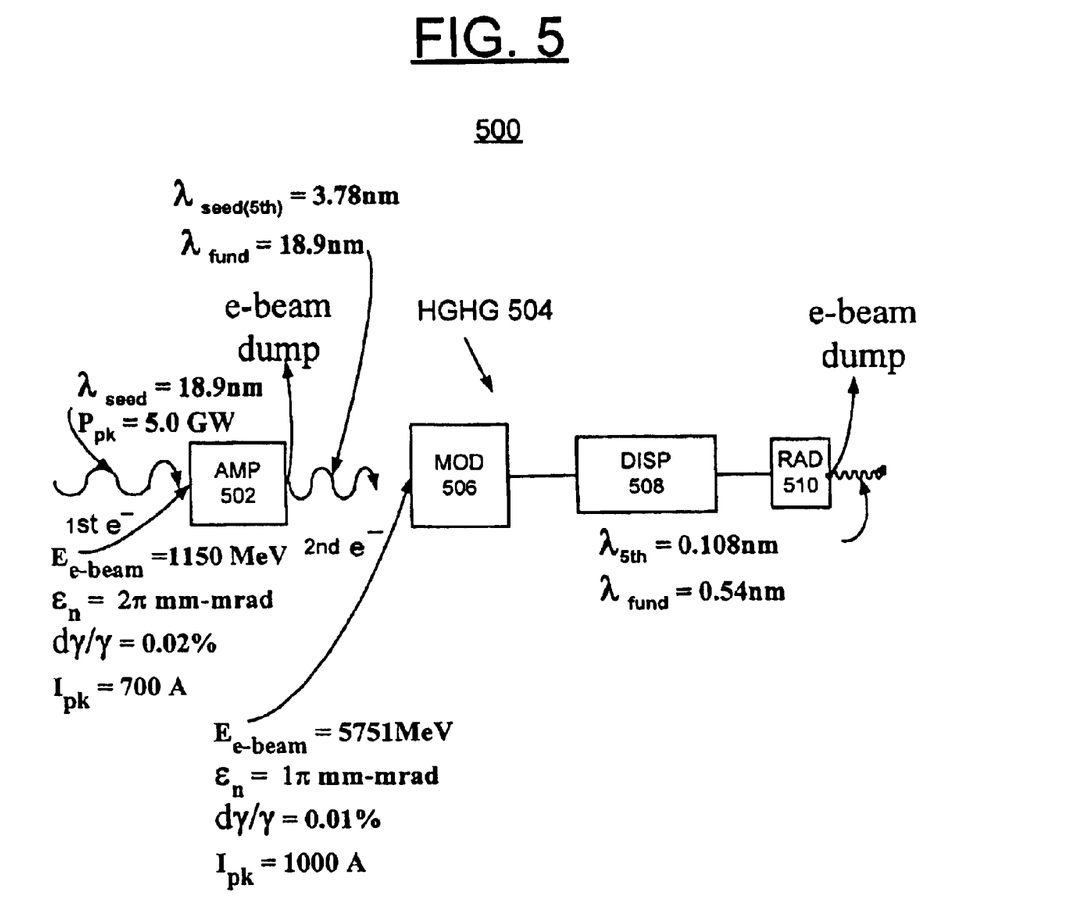
FIG. 5 is a diagram illustrating an exemplary fourth example of a modular arrangement for implementing a next-generation light source in accordance with the preferred embodiment.

Referring to FIG. 5, there is shown a fourth example or fourth arrangement generally designated by the reference character 500. Fourth arrangement 500 includes a soft x-ray seed laser amplifier AMP 502 and one HGHG Module 504. In the arrangement 500, a tabletop, Ni-like molybdenum soft x-ray laser with $\lambda_{seed}$=18.9 nm, $P_{pk}$=5 GW is used as the seed to the amplifier module AMP 502, of which, the coherent power of the correct polarization is ~0.1 MW. This tabletop, soft x-ray laser is, for example, identical to the COMET laser that is currently operational at Lawrence Livermore National Laboratory (LLNL). A first electron beam 1st e⁻ is applied to AMP 502 having electron beam properties, for example, electron beam energy $E_{e-beam}$=1150 MeV, normalized natural emittance $\epsilon_n$=2π mm-mrad, energy spread dγ/γ=0.02%, and peak current $I_{pk}$=700A. The electron beam output of first AMP 502 is bent into an electron beam dump indicated at line labeled e-beam dump. A second electron beam 2nd e⁻ applied to HGHG Module 504 has electron beam properties, for example, electron beam energy $E_{e-beam}$=5751 MeV, normalized natural emittance $\epsilon_n$=1π mm-mrad, energy spread dγ/γ=0.01%, and peak current $I_{pk}$=1000A. The fifth nonlinear harmonic, $\lambda_{seed(5th)}$=3.78 nm output of AMP 502 serves to seed the HGHG module 504. HGHG module 504 includes a modulative section, MOD 506, a dispersive section DISP 508 and a radiative section RAD 510. The radiative section RAD 510 is tuned to the seventh harmonic of the input seed, requiring an electron beam energy of ~6 GeV. The electron beam output of RAD 510 of the HGHG module 504 is bent into an electron beam dump indicated at line labeled e-beam dump. Utilizing the fifth nonlinear harmonic of the output radiation yields 1.0 Å radiation.

Referring to FIG. 6, there is shown a fifth example or fifth arrangement generally designated by the reference character 600. Fifth arrangement 600 provides efficient wavelength shifting in accordance with the preferred embodiment and can be used in conjunction with all other arrangements 200, 300, 400, and 500, and can provide arbitrary adjustment of the final wavelength. In the wavelength shifting arrangement 600, acceleration and radiation-producing modules are more integrated, for example, than in the arrangements 200, 300, 400 and 500. Wavelength shifting arrangement 600 includes three primary steps or functions of imprint 602, upconvert 604 and reinforce 606. Here, the simplest case is to use modules in the following order, as shown in FIG. 6. These modules described below are schematically shown below the imprint 602, upconvert or wavelength shift 604 and reinforce 606 steps in the left portion of FIG. 6 together with respective charts illustrating functional results on the right portion of FIG. 6.

As shown in FIG. 6, the imprinting step or imprint function 602 includes a modulation step 610 and an overbunch step 612. First, an electron beam is produced using a gun and a linear accelerator. In modulation step 610, a seed laser is introduced to the electron beam in an undulator, whose fundamental resonance is tuned to the seed laser for the electron beam energy. This is performed to induce a specified amount of energy modulation. In overbunch step 612 then, the electron beam is over-rotated in phase space using a bunch compressor. The upconverting or wavelength shifting step or upconvert or wavelength shift function 604 includes an energy chirp step 614 and a compress step 616. After the imprinting step, the electron beam is introduced to an accelerating section whose phase is slightly off-crest to induce an energy chirp at energy chirp step 614. Next, the electron beam is compressed through a second bunch compressor at the compress step 616. The reinforcing step or reinforce function includes a remove chirp step 618 and a use harmonics step 620. The chirp is removed in an additional accelerating section at the remove chirp step 618. After further acceleration, the electron beam is injected into an undulator, TUHGS, or HGHG module in the illustrated use harmonics step 620. Since the electron beam is prebunched to a wavelength tuned by the compression process, the electron beam radiates in a fully coherent fashion. The resultant coherent output can be further introduced to more of the same wavelength-shifting modules or other modules or one can directly use the harmonic output of the undulator/beam system.

Wavelength shifting allows the generation of arbitrary wavelengths independent of the seed after already imprinting its quality on an electron bunch. It can also be used to shift wavelengths up or down and so can be used for final wavelength tuning by passing wavelength-shifted, saturated beams through undulators tuned to the microbunch spacing.

A simulation code, MEDUSA, is a 3D, nonlinear polychromatic code based on the source-dependent expansion of the Gauss-Hermite waveguide modes. It has been benchmarked at the fundamental against four other simulation codes and demonstrates good agreement. It is capable of simulating TUHGS, HGHG, and nonlinear harmonic generation. The power in the third nonlinear harmonic has also been compared with the 3D analytical model and is in good agreement. For the following modular cases, the output radiation at the desired nonlinear harmonic was fed into the next section with the fresh electron bunch in consecutive computer runs. As an example, using MEDUSA, second arrangement 300 was treated in numerical simulation. The peak output power of the fifth nonlinear harmonic from the radiative section 310 of HGHG 1 302 is $8.6 \times 10^4$ W and serves to seed HGHG 2 304 along with a fresh electron bunch. The fifth nonlinear harmonic to the radiative section 316 of HGHG 2 304 yields a peak power of $2.2 \times 10^6$ W. The output saturation peak power of the fundamental and nonlinear harmonic output of radiative sections 310, 316 of HGHG 1, 302 and HGHG 2, 304 are further summarized in the following Table 1.

TABLE 1

Power after HGHG module in Numerical second generation arrangement 300 for the odd harmonics up to h = 7.

|  | Harmonic Number | Radiation Wavelength (nm) | Saturation Point z (m) | Peak Power (W) |
|---|---|---|---|---|
| HGHG 1 | 1 | 38 | 19.7 | $5.3 \times 10^8$ |
|  | 3 | 12.67 | 20.1 | $3.8 \times 10^6$ |
|  | 5 | 7.6 | 18.5 | $8.6 \times 10^4$ |
|  | 7 | 5.4 | 19.5 | $1.3 \times 10^4$ |
| HGHG 2 | 1 | 1.09 | 92.9 | $1.3 \times 10^9$ |
|  | 3 | 0.36 | 93.2 | $7.4 \times 10^6$ |
|  | 5 | 0.218 | 86.6 | $2.2 \times 10^6$ |
|  | 7 | 0.156 | 90.6 | $5.8 \times 10^5$ |

We now further analyze the specific case that each linear accelerator module is composed of 3-m, SLAC-type accelerating structures, each capable of 50-MeV acceleration (assuming two SLED cavities and four 3-m structures per each modulator and klystron assembly). This translates into 1 GeV/60 m of linear accelerator. This conservative estimate is used to compare the "amount" of linear accelerator required for each of the five exemplary arrangements 200, 300, 400, 500 and 600 described above. Table 2 lists of the required electron beam energy, radiation wavelength, and the length of the accelerator and radiation production sections (all-inclusive; undulators, drift, and dispersive sections) for Example 2 are provided.

TABLE 2

Length Review of Numerical second generation arrangement 300.

|  | Electron Beam Energy (GeV) | Total Length of Linear Accelerator Required (m) | Radiation Wavelength (nm) of $5^{th}$ harmonic to HGHG section | Total Length of Radiation Production Section Required (m) |
|---|---|---|---|---|
| HGHG 1, 302 | 0.7 | 42 | 7.6 | 21 |
| HGHG 2, 304 | 4.8 | 288 | 0.217 | 94 |
| Total Lengths | na | 330 | na | 115 |

In brief summary, the importance of the modular methods as well as nonlinear harmonic generation is demonstrated for building toward next generation laser-like light sources. Although many other modular combinations do indeed exist, producing both longer and shorter wavelengths of varying powers, the above described arrangements of the preferred embodiment were chosen to illustrate a type of source that is attainable, within monetary and/or physical space constraints, by many more institutions than currently expected. In particular, new electron beams are not fully necessary, as multiple bunches can be generated in the linear accelerator and fast kicker magnets could simply gate bunches into specific modules.

While the present invention has been described with reference to the details of the embodiments of the invention shown in the drawing, these details are not intended to limit the scope of the invention as claimed in the appended claims.

What is claimed is:

1. A method for implementing a next generation synchrotron light source comprising the steps of:
   providing initial electron beam source modules for producing multiple harmonic wavelength photons including the steps providing an electron gun and an accelerating structure for producing an electron beam; said accelerating structure receiving emitted electrons from said electron gun and raising electron beam energy; providing an electron bunch compressor for prebunching said electron beam to a wavelength tuned by a compression process, providing a seed laser for producing a seed laser beam and coupling said seed laser beam with said prebunched electron beam;
   providing first electron beam source modules for producing a first electron beam;
   combining said multiple harmonic wavelength photons with said first electron beam; and
   providing selected radiation production modules for generating fundamental and nonlinear harmonics of said combined electron beam to be used as the next generation synchrotron light source or as a coherent seed for additional selected modules.

2. A method for implementing a next generation synchrotron light source as recited in claim 1 wherein the step of providing initial electron beam source modules for producing multiple harmonic wavelength photons further includes the steps of providing a radiation production section receiving said seed laser beam coupled with said prebunched electron beam for producing multiple harmonic wavelength photons.

3. A method for implementing a next generation synchrotron light source as recited in claim 1 wherein the step of providing selected radiation production modules for generating fundamental and nonlinear harmonics of said combined electron beam includes the steps of providing a first amplifier module and a high-gain harmonic generation (HGHG) module coupled to said first amplifier module; applying a seed laser beam $\lambda_{fund}$ and a first electron beam to said first amplifier module; generating fundamental $\lambda_{fund}$ and a predefined nonlinear harmonics $\lambda_{seed(predefined)}$ in said first amplifier module; and applying a second electron beam and said generated fundamental $\lambda_{fund}$ and said predefined nonlinear harmonics $\lambda_{seed(predefined)}$ from said first amplifier module to said high-gain harmonic generation (HGHG) module that is used as a coherent seed for said high-gain harmonic generation (HGHG) module.

4. A method for implementing a next generation synchrotron light source as recited in claim 3 wherein the step of providing selected radiation production modules for generating fundamental and nonlinear harmonics of said combined electron beam further includes the steps of generating fundamental $\lambda_{fund}$ and said predefined nonlinear harmonics $\lambda_{seed(predefined)}$ in said high-gain harmonic generation (HGHG) module to be used as the next generation synchrotron light source.

5. A method for implementing a next generation synchrotron light source as recited in claim 1 wherein the step of providing selected radiation production modules for generating fundamental and nonlinear harmonics of said combined electron beam includes the steps of providing a first high-grain harmonic generation (HGHG) module and a second high-gain harmonic generation (HGHG) module coupled to said first high-gain harmonic generation (HGHG) module; applying a seed laser beam $\lambda_{fund}$ and a first electron beam to said first high-gain harmonic generation (HGHG) module; generating fundamental $\lambda_{fund}$ and a predefined nonlinear harmonics $\lambda_{seed(predefined)}$ in said first high-gain harmonic generation (HGHG) module; and applying a second electron beam and said generated fundamental $\lambda_{fund}$ and said predefined nonlinear harmonics $\lambda_{seed(predefined)}$ to said second high-gain harmonic generation (HGHG) module that is used as a coherent seed for said second high-gain harmonic generation (HGHG) module; and generating fundamental $\lambda_{fund}$ and said predefined nonlinear harmonics $\lambda_{seed(predefined)}$ in said second high-gain harmonic generation (HGHG) module to be used as the next generation synchrotron light source.

6. A method for implementing a next generation synchrotron light source as recited in claim 1 wherein the step of providing selected radiation production modules for generating fundamental and nonlinear harmonics of said combined electron beam includes the steps of providing selected radiation production modules for producing the next generation synchrotron light source by a three step process including imprinting, upconverting or wavelength shifting and reinforcing or strengthening of said combined electron beam.

7. A method for implementing a next generation synchrotron light source as recited in claim 6 wherein the steps of imprinting of said combined electron beam includes the steps of receiving a seed laser beam and a first electron beam in an undulator for providing a specified amount of energy modulation and using a bunch compressor for overbunching of said electron beam.

8. A method for implementing a next generation synchrotron light source as recited in claim 7 wherein the step of upconverting or wavelength shifting of said combined electron beam includes the steps of applying said overbunched electron beam to an accelerating section to induce an energy chirp to said electron beam; and compressing said electron beam using a second bunch compressor.

9. A method for implementing a next generation synchrotron light source as recited in claim 8 wherein the step of reinforcing or strengthening of said combined electron beam includes the steps of removing said energy chirp from said electron beam in a second accelerating section; injecting said resulting electron beam to a radiation production module to use harmonics of said electron beam.

10. A method for implementing a next generation synchrotron light source as recited in claim 9 wherein the step of injecting said electron beam to a radiation production module includes the step of injecting said resulting electron beam into an undulator, two-undulator harmonic generation schemes (TUHGS) or a high-gain harmonic generation (HGHG) module.

11. A method for implementing a next generation synchrotron light source comprising the steps of:
   providing initial electron beam source modules for producing multiple harmonic wavelength photons;
   providing first electron beam source modules for producing a first electron beam;
   combining said multiple harmonic wavelength photons with said first electron beam;
   providing selected radiation production modules for generating fundamental and nonlinear harmonics of said combined electron beam including the steps of providing a first amplifier module and a second amplifier module coupled to said first amplifier module; applying a seed laser beam $\lambda_{fund}$ and a first electron beam to said first amplifier module; generating fundamental $\lambda_{fund}$ and a predefined nonlinear harmonics $\lambda_{seed(predefined)}$ in said first amplifier module; and applying a second electron beam and said generated fundamental $\lambda_{fund}$ and said predefined nonlinear harmonics $\lambda_{seed(predefined)}$ to said second amplifier module that is used a coherent seed for said second amplifier module; and generating fundamental $\lambda_{fund}$ and said predefined nonlinear harmonics $\lambda_{seed(predefined)}$ in said second amplifier module.

12. A method for implementing a next generation synchrotron light source as recited in claim 11 wherein the step of providing selected radiation production modules for generating fundamental and nonlinear harmonics of said combined electron beam further includes the steps of providing a third amplifier module coupled to said second amplifier module and a fourth amplifier module coupled to said third amplifier module; applying a third electron beam and said generated fundamental $\lambda_{fund}$ and said predefined nonlinear harmonics $\lambda_{seed(predefined)}$ from said second amplifier module to said third amplifier module that is used as a coherent seed for said third amplifier module; generating fundamental $\lambda_{fund}$ and said predefined nonlinear harmonics $\lambda_{seed\ (predefined)}$ in said third amplifier module; and applying a further electron beam and said generated fundamental $\lambda_{fund}$ and said predefined nonlinear harmonics $\lambda_{seed\ predefined)}$ from said third amplifier module to said fourth amplifier module that is used as a coherent seed for said fourth amplifier module; and generating fundamental and said predefined nonlinear harmonic in said fourth amplifier to be used as the next generation synchrotron light source.

13. A method for implementing a next generation synchrotron light source as recited in claim 11 wherein the step of providing selected radiation production modules for generating fundamental and nonlinear harmonics of said combined electron beam includes the steps of providing a high-gain harmonic generation (HGHG) module; said HGHG module including a modulative section, a dispersive section and a radative section; applying a third electron beam and said generated fundamental $\lambda_{fund}$ and said predefined nonlinear harmonics $\lambda_{seed(predefined)}$ from said second amplifier module to said high-gain harmonic generation (HGHG) module.

14. A method for implementing a next generation synchrotron light source as recited in claim 13 wherein the step of providing selected radiation production modules for generating fundamental and nonlinear harmonics of said combined electron beam further includes the steps of generating fundamental and said predefined nonlinear harmonic in said high-gain harmonic generation (HGHG) module to be used as the next generation synchrotron light source.

15. A modular system for implementing a next generation synchrotron light source comprising:
   initial electron beam source modules for producing multiple harmonic wavelength photons including a seed laser providing a seed laser beam $\lambda_{fund}$;
   first electron beam source modules for producing a first electron beam;
   a mixer for combining said multiple harmonic wavelength photons with said first electron beam;
   radiation production modules for generating fundamental and nonlinear harmonics of said combined electron beam to be used as the next generation synchrotron light source or as a coherent seed for additional selected modules including four amplifier modules connected in series, each of said four amplifier modules tuned to a fundamental resonance; said seed laser beam $\lambda_{fund}$ and said first electron beam applied to a first amplifier module of said four series connected amplifier modules; said first amplifier module generating fundamental $\lambda_{fund}$ and a predefined nonlinear harmonics $\lambda_{seed\ (predefined)}$; a second electron beam and said generated fundamental $\lambda_{fund}$ and said predefined nonlinear harmonics $\lambda_{seed(predefined)}$ from said first amplifier module applied to a second amplifier module and used as a coherent seed for said second amplifier module; said second amplifier module generating fundamental $\lambda_{fund}$ and said predefined nonlinear harmonics $\lambda_{seed\ (predefined)}$; a third electron beam and said generated fundamental $\lambda_{fund}$ and said predefined nonlinear harmonics $\lambda_{seed(predefined)}$ from said second amplifier module applied to a third amplifier module and used as a coherent seed for said third amplifier module; said third amplifier module generating fundamental $\lambda_{fund}$ and said predefined nonlinear harmonics $\lambda_{seed\ (predefined)}$; and a fourth electron beam and said generated fundamental $\lambda_{fund}$ and said predefined nonlinear harmonics $\lambda_{seed(predefined)}$ from said third amplifier module applied to a fourth amplifier module and used as a coherent seed for said fourth amplifier module; said fourth amplifier module generating fundamental $\lambda_{fund}$ and nonlinear harmonics $\lambda_{predefined}$ used as the next generation synchrotron light source.

16. A modular system for implementing a next generation synchrotron light source as recited in claim 15 wherein said radiation production on modules for generating fundamental and nonlinear harmonics of said combined electron beam further include a first high-gain harmonic generation (HGHG) module and a second high-gain harmonic generation (HGHG) module connected in series; said seed laser beam $\lambda_{fund}$ and said first electron beam applied to said first high-gain harmonic generation (HGHG) module; said first high-gain harmonic generation (HGHG) module inducing energy modulation and spatial bunching in respective modulative and radiative sections; said first high-gain harmonic generation (HGHG) module generating fundamental $\lambda_{fund}$ and a predefined nonlinear harmonics $\lambda_{seed(predefined)}$; a second electron beam and said fundamental $\lambda_{fund}$ and a predefined nonlinear harmonics $\lambda_{seed(predefined)}$ from said first high-gain harmonic generation (HGHG) module applied to said second high-gain harmonic generation (HGHG) module; and said second high-gain harmonic generation (HGHG) module producing a longitudinally coherent output radiation in said predefined nonlinear harmonics $\lambda_{predefined}$ used as the next generation synchrotron light source.

17. A modular system for implementing a next generation synchrotron light source comprising:
   initial electron beam source modules for producing multiple harmonic wavelength photons including a seed laser providing a seed laser beam $\lambda_{fund}$;
   first electron beam source modules for producing a first electron beam;
   a mixer for combining said multiple harmonic wavelength photons with said first electron beam;
   radiation production modules for generating fundamental and nonlinear harmonics of said combined electron beam to be used as the next generation synchrotron light source or as a coherent seed for additional selected modules including a first amplifier module and a second amplifier module connected in series and a high-gain harmonic generation (HGHG) module connected to said second amplifier module; said seed laser beam $\lambda_{fund}$ and said first electron beam applied to said first amplifier module; said first amplifier module generating fundamental $\lambda_{fund}$ and a predefined nonlinear harmonics $\lambda_{seed(predefined)}$; a second electron beam and said generated fundamental $\lambda_{fund}$ and said predefined nonlinear harmonics $\lambda_{seed(predefined)}$ from said first amplifier module applied to said second amplifier module and used as a coherent seed for said second amplifier module; said second amplifier module generating fundamental $\lambda_{fund}$ and said predefined nonlinear harmonics $\lambda_{seed(predefined)}$; a third electron beam and said generated fundamental $\lambda_{fund}$ and said predefined nonlinear harmonics $\lambda_{seed(predefined)}$ from said second amplifier module applied to said high-gain harmonic generation (HGHG) module; said high-gain harmonic generation (HGHG) module including a modulative section to induce predefined energy modulation in said third electron beam; and a radative section tuned to said predefined nonlinear harmonic $\lambda_{seed(predefined)}$ from said second amplifier module and producing a longitudinally coherent output radiation in said predefined nonlinear harmonic $\lambda_{predefined}$ used as the next generation synchrotron light source.

18. A modular system for implementing a next generation synchrotron light source comprising:

initial electron beam source modules for producing multiple harmonic wavelength photons includes a soft x-ray seed laser providing a seed laser beam $\lambda_{fund}$;

first electron beam source modules for producing a first electron beam;

a mixer for combining said multiple harmonic wavelength photons with said first electron beam;

radiation production modules for generating fundamental and nonlinear harmonics of said combined electron beam to be used as the next generation synchrotron light source or as a coherent seed for additional selected modules including an amplifier module and a high-gain harmonic generation (HGHG) module connected to said amplifier module; said seed laser beam $\lambda_{fund}$ and said first electron beam applied to said amplifier module; said amplifier module generating fundamental $\lambda_{fund}$ and a predefined nonlinear harmonics $\lambda_{seed(predefined)}$ a second electron beam and said generated fundamental $\lambda_{fund}$ and said predefined nonlinear harmonics $\lambda_{seed(predefined)}$ from said first amplifier module applied to said high-gain harmonic generation (HGHG) module; said high-gain harmonic generation (HGHG) module producing a longitudinally coherent output radiation in said predefined nonlinear harmonic $\lambda_{predefined}$ used as the next generation synchrotron light source.

19. A modular system for implementing a next generation synchroton light source as recited in claim 18 wherein said radiation production modules for generating fundamental and nonlinear harmonics of said combined electron beam further include selected radiation production modules for producing the next generation synchrotron light source including functions for imprinting, upconverting or wavelength shifting and reinforcing or strengthening of said combined electron beam.

20. A modular system for implementing a next generation synchrotron light source as recited in claim 19 wherein said imprinting function for imprinting of said combined electron beam includes an undulator for receiving a seed laser beam and a first electron beam and for providing a specified amount of energy modulation and a bunch compressor for overbunching of said electron beam; wherein said upconverting or wavelength shifting function includes an accelerating section receiving said overbunched electron beam to induce an energy chirp to said electron beam; and a second bunch compressor compressing said electron beam; and wherein said reinforcing or strengthening function for reinforcing or strengthening of said combined electron beam includes a second accelerating section for removing said energy chirp from said electron beam; a radiation production module receiving said resulting electron beam to use harmonics of said electron beam.

* * * * *